United States Patent [19]

Ichikawa et al.

[11] 4,391,769

[45] Jul. 5, 1983

[54] APPARATUS FOR LOADING UNVULCANIZED TIRES ON TIRE VULCANIZING MACHINE

[75] Inventors: Katsumi Ichikawa, Akashi; Itaru Amano, Kobe; Keiji Ozaki, Takarazuka; Seiichi Suzuki, Kodaira, all of Japan

[73] Assignees: Bridgestone Tire Co., Ltd.; Kabushiki Kaisha Kobe Seiko Sho, both of Kobe, Japan

[21] Appl. No.: 272,268

[22] Filed: Jun. 10, 1981

[30] Foreign Application Priority Data

Jun. 14, 1980 [JP] Japan .................................. 55-81167

[51] Int. Cl.$^3$ ............................................. B29H 5/02
[52] U.S. Cl. ....................................... 264/326; 425/38
[58] Field of Search ......................... 425/28 R, 32, 38; 264/326, 315

[56] References Cited

U.S. PATENT DOCUMENTS 2,927,343 3/1960 Soderquist ............................ 425/32
3,222,715 12/1965 Harris ................................... 425/32
3,824,048 7/1974 Getz .................................. 425/28 R
4,197,065 4/1980 Di Rosa ............................ 425/38 X Primary Examiner—J. Howard Flint, Jr.
Attorney, Agent, or Firm—Oblon, Fisher, Spivak, McClelland & Maier

[57] ABSTRACT

An apparatus for loading unvulcanized tires on a tire vulcanizing machine of the sort which has a vertically movable loader arm with a contractibly expansible paddle at the fore end thereof, an oscillating cylinder cooperative with a movable arm for oscillating the loader arm in a horizontal plane, and a stand-by station for temporarily holding unvulcanized tires to be loaded on the vulcanizing machine, the loader arm being adapted to load the unvulcanized tires one after another in a mold on the machine by lifting, oscillating and paddle-expanding operations. The loading apparatus is characterized by the provision of a plural number of stand-by stations on a locus of oscillatory movement of one loader arm, and a plural number of oscillating cylinders cooperative with a corresponding number of movable arms for oscillating the loader arm between the center of the mold and a selected one of the stand-by stations.

2 Claims, 10 Drawing Figures

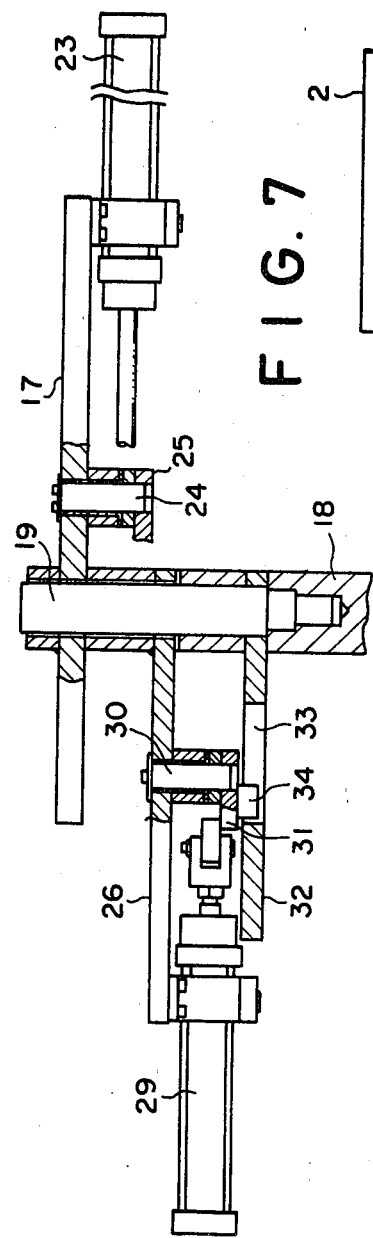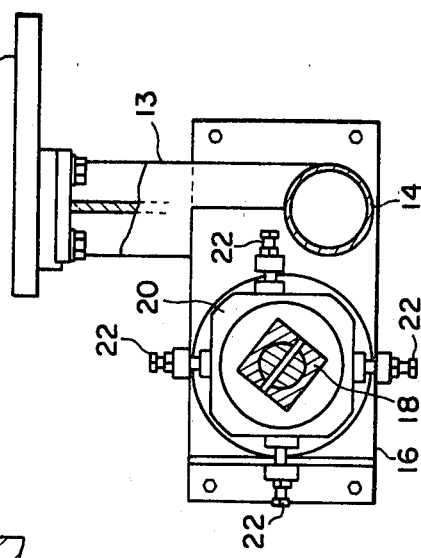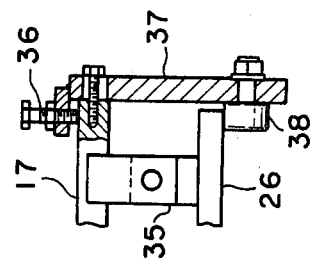

APPARATUS FOR LOADING UNVULCANIZED TIRES ON TIRE VULCANIZING MACHINE

BACKGROUND OF THE INVENTION

This invention relates to an apparatus for loading unvulcanized tires in a predetermined position on a tire vulcanizing machine.

Recent developments in the tire industry have led the way to tire production in large-scale plants and automation of operations in various phases of the manufacturing process, including the field of the tire vulcanizing machines to which the present invention pertains.

In a latest system, a sheet-like material which is obtained after the kneading and blending stages is fed to a molding machine, and the molded unvulcanized tires are then transferred to a vulcanizer or vulcanizing machine for the vulcanizing treatment, followed by the post-inflation for the inflating and cooling treatments and transfer to a finishing treatment of the final stage.

The operations in the respective stages are performed automatically except the job of unloading the unvulcanized tires from the carriage and stacking them in stand-by stations prior to loading on the vulcanizing machine, which still requires manual labor of a number of workers. Namely, the unvulcanized tires which have been delivered by the carriage are once stacked in the stand-by stations outside the vulcanizing machine and loaded one after another into the molds by chucking operation of loader arms which are provided on the machine.

Under these circumstances, from the standpoint of achieving automation of the operation, it is desired that the tire stacking job be handled by one person who is in charge of controlling the whole system. However, in actual operations, more than two persons are usually required exclusively for the stacking operation to cope with the problem of operational time lag which would otherwise be unavoidable when the tires have to be stacked anew, especially in a case where the tires are stacked only in one stand-by station per mold, compelling to stop the vulcanizer for a while and thus impairing its operation efficiency.

SUMMARY OF THE INVENTION

With the foregoing in view the present invention has as its object the provision of an apparatus for loading unvulcanized tires on a tire vulcanizing machine, in which the tires are stacked in a plural number of stand-by stations to enhance the operation efficiency of the machine and to reduce the number of persons required for the stacking operation by affording a greater margin in the amount of stacked tires, thus permitting to perform the tire stacking operation in a more sophisticated manner.

According to a fundamental aspect of the present invention, there is provided an apparatus for loading unvulcanized tires on a tire vulcanizing machine of the type which has a vertically movable loader arm with a contractibly expansible paddle at the fore end thereof, an oscillating cylinder cooperative with a movable arm for oscillating the loader arm in a horizontal plane, and a stand-by station for temporarily holding unvulcanized tires, the loader arm being adapted to load the unvulcanized tires one after another in a mold of the vulcanizing machine by lifting, oscillating and paddle-expanding operations, the loading apparatus comprising: a plural number of stand-by stations located on a locus of oscillatory movement of one loader arm of said vulcanizing machine; and a plural number of oscillating cylinders and a corresponding number of movable arms cooperative with each other for oscillating the loader arm between the center of the mold and a selected one of the stand-by stations.

The above and other objects, features and advantages of the present invention will become apparent from the following description of the appended claims, taken in conjunction with the accompanying drawings which illustrate one preferred embodiment of the present invention.

BRIEF DESCRIPTION OF THE DRAWINGS

In the accompanying drawings:

FIG. 5 is a sectional view taken on line V—V of FIG. 8, showing major components of the loader arm mechanism;

FIG. 6 is a sectional view taken on line VI—VI of FIG. 8;

FIG. 7 is a sectional view taken on line VII—VII of FIG. 4;

DESCRIPTION OF PREFERRED EMBODIMENT

Figure 1:
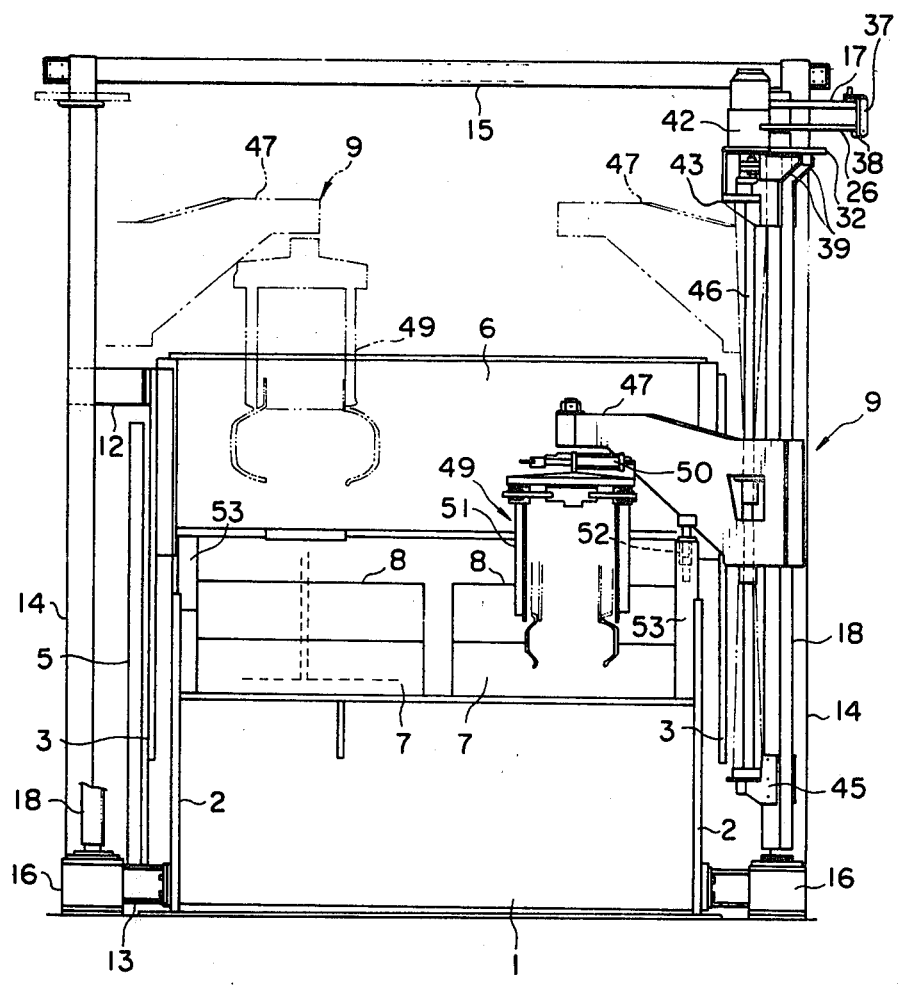
FIG. 1 is a front view of a tire vulcanizing machine incorporating the present invention.
Figure 2:
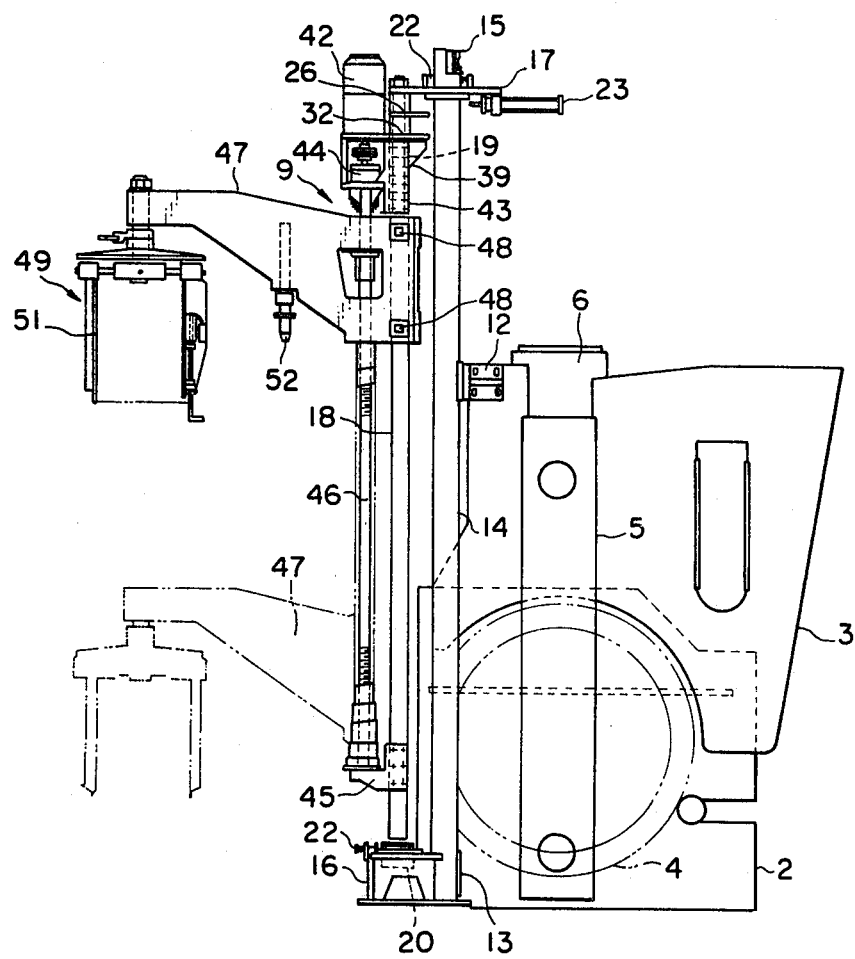
FIG. 2 is a right-hand side view of the vulcanizer.
Figure 3:
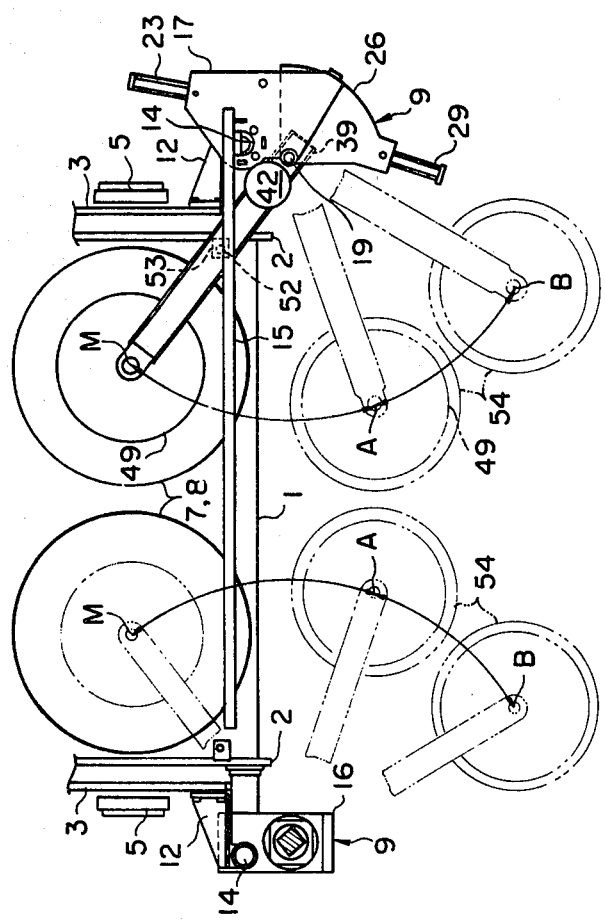
FIG. 3 is a plan view of the same machine.
Figure 4:
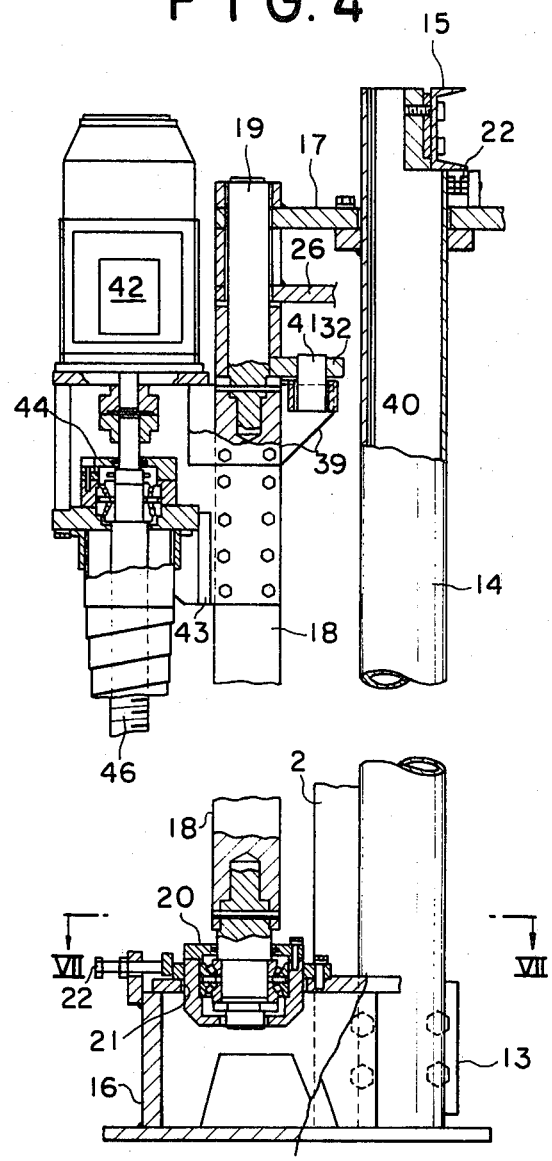
FIG. 4 is an enlarged view showing major components of the machine of FIG. 2.

Referring to FIGS. 1 to 3, there is illustrated a tire vulcanizing machine incorporating the present invention, more specifically, a tire vulcanizing machine of the twin type which is provided with two sets of paired upper and lower molds side-by-side for vulcanizing two tires concurrently.

The vulcanizing machine or vulcanizer is provided with a relatively large base 1 with side plates 2 at the opposite ends, forming a bed of the machine.

Erected opposingly on the outersides of the base 1 are side frames 3 which are each provided with a crank gear 4 and a side link 5 thereby to open and close a top link 6 between the side frames 3. By this known operation, an upper mold on an upper hot plate is closed on and off a lower mold which is provided on a lower hot plate.

The vulcanizer is provided with a pair of loaders 9 one for each set of molds. Each loader 9 has a contractibly expansible paddle at the fore end of a vertically movable swing or oscillating arm.

More specifically, as shown in FIGS. 1 to 3, 4 and 7, a pair of cylindrical loader support columns 14 are fixed along the side frames 3 by means of upper and lower brackets 12 and 13 which are fixed respectively in the upper end portion on the front side of the side frames 3 and in the lower portions on the front side of the side plates 2 of the base 1. A link 15 is bridged between the upper ends of the support columns 14 to form a gate-like fixed framework for the loader lifting and oscillating mechanism.

The oscillating mechanism includes a lower support structure 16 integrally secured to the lower end of the loader support column 14 and a plate-like upper support structure 17 fixedly fitted on the upper end of the support column 14, thereby rotatably supporting therebetween a vertical main rotary shaft 18 and an auxiliary rotary shaft 19. In this instance, a bearing case 20 which is provided at the lower end of the main shaft 18 is fixably movable relative to a bore 21 in a top plate of the lower support structure 16 by way of adjusting means 22 with bolts on four sides of the bearing case 20. At the upper end of the rotary shaft which constitutes the auxiliary shaft 19, the upper support structure is adjustably fixed to the support column 14 by similar adjusting means 22. Therefore, the main rotary shaft 18 is adjustable relative to the loader support column 14 for the purpose of coinciding the locus of the loader with the center of the mold.

The rotary mechanism which rotates the main and auxiliary shafts in this manner includes on its fixed part the above-mentioned upper support structure 17 on the underside of which a first oscillating cylinder 23 (hereinafter referred to as "first cylinder" for brevity) is mounted in a horizontal position for pivoting a crank arm 25 about a pin 24 located forward of the first cylinder 23 as shown in FIGS. 5 and 8 to 10. Mounted horizontally beneath the upper support structure 17 is a first movable arm 26 substantially of sectoral shape for rotation about the auxiliary shaft 19. The first movable arm 26 is provided with a first cam groove 27 for engagement with the cam roller 28 which is projected from the crank arm 25. The first movable arm 26 mounts thereon a second rotary cylinder 29 (hereinafter referred to as "second cylinder") and a crank arm 31 with a pin 30. A second movable arm 32 which is mounted in a lowermost position on the auxiliary shaft 19 is provided with a second cam groove 33 for engagement with a cam roller 34.

The parts which are rotated by the above-mentioned rotary drive mechanism include a pair of link plates 39 secured to opposite sides of the outer periphery of the top end portion of the main rotary shaft 18, holding therebetween a box piece 40 which is connected to an interlocking pin 41 extended from the second movable arm 32. A lift motor 42 is mounted in position through the link plates 39. On the other hand, a bearing case 44 is fixedly mounted between a first link plate 39 and an upper oscillatory arm 43 which is provided beneath the link plate 39. A vertical lift shaft 46 is journalled in the upper oscillatory arm 43 and a lower oscillatory arm 45 which is mounted on a lower end portion of the main rotary shaft 18, and driven from a motor 42 to lift up and down a loader arm 47 of the ball screw type coupling. The loader arm 47 has its base portion fitted on the main rotary shaft 18 and imparted with upward or downward movement through guide rollers 48.

Indicated at 49 is a paddle which is provided at the fore end of the loader arm 47, which has its radially opposing paddle elements 51 expanded or contracted by a paddle operating cylinder 50 of FIG. 1. The reference numeral 52 denotes a lock pin which is projected from the loader arm 47 and engageable with a lock receptacle cylinder 53 on the front side of the respective side plate 2 of the base as shown in FIG. 1 thereby to ensure centering relative to the vulcanizing machine.

With a twin type tire vulcanizing machine of this sort, it has been the general practice to stack the unvulcanized tires in two stand-by stations or positions in total which are located forward of the machine as indicated at 54. However, according to the present invention, there are provided four stack positions, two for each set of molds, along the locus of the oscillatory movement of the paddle 49 as shown in FIG. 3, each accommodating a plural number of unvulcanized tires, for example, three to four tires in each stack position.

The unvulcanized tires which are transferred by a carriage (not shown) are collectively stacked in the respective stand-by positions (see FIG. 3) and successively loaded into the vulcanizing machine in the following manner.

Figure 8:
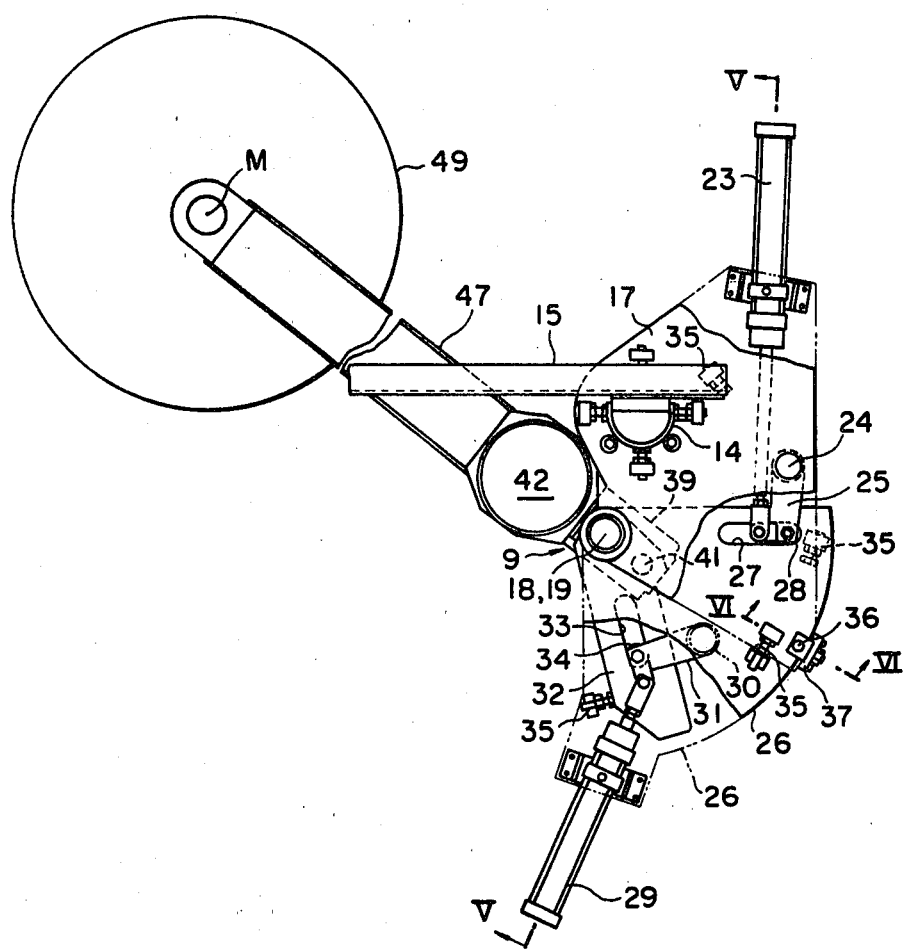
FIG. 8 is a plan view of the loader arm mechanism.
Figure 9:
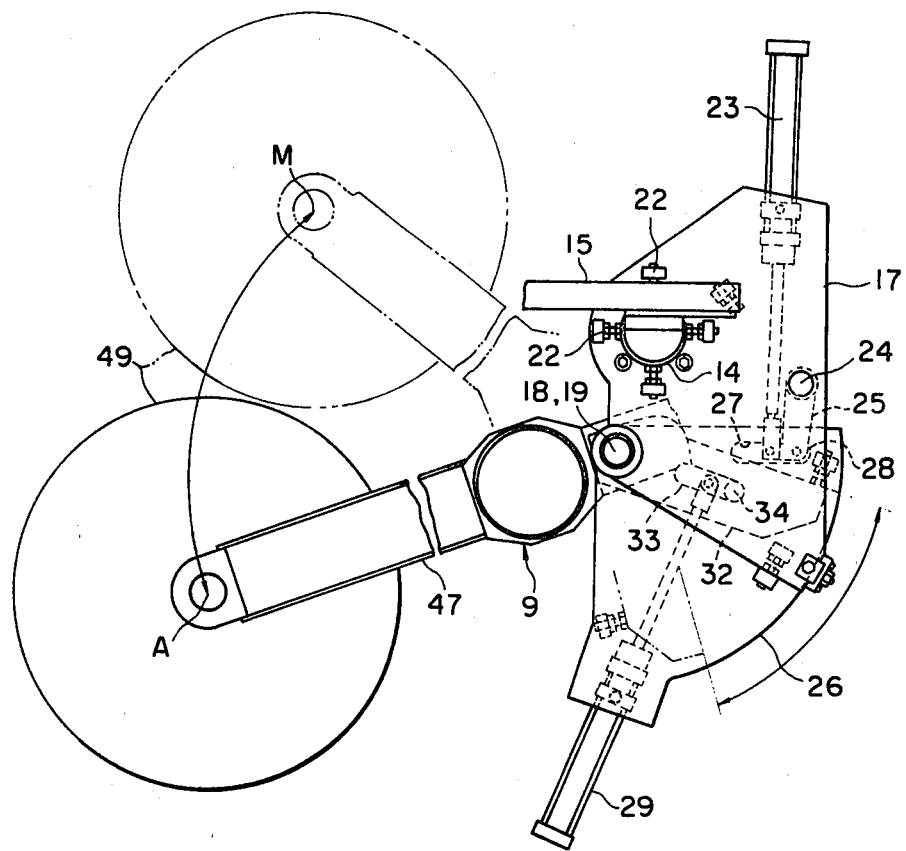
FIGS. 9 and 10 are plan views explanatory of the operation of the loader arm mechanism.
Figure 10:
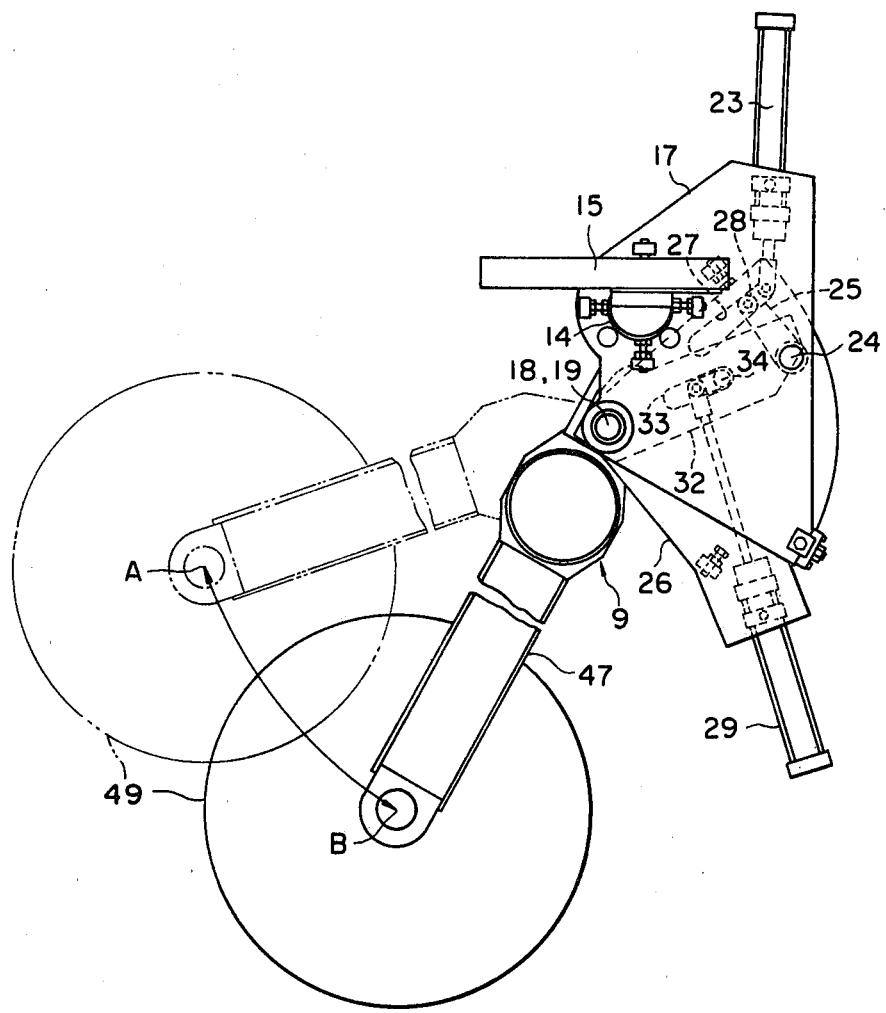

Namely, as shown in FIGS. 3 and 8 to 10, in order to load the unvulcanized tires in the stack position A which is located closer to the center of the mold M than the other stack position B, the paddle 49 which is located over the mold center M in FIG. 8 is rotated into a position over the stand-by position A as shown in FIG. 9 by extending the second cylinder 29, rotating the second movable arm 32 alone with the first movable arm 26 and the upper support structure 17 held stationary to each other. As a result, the paddle 49 is chucked out to the stand-by position A. Then, the lift shaft 46 is moved to lower the paddle 49 toward the stand-by position A. Since the paddle 49 is closed at this time, it is directly inserted into a tire. Upon detection of a dropped point, the paddle 49 is expanded to chuck on the tire and lifted up again. The lifted paddle 49 is rotated to a position over the mold center M by an inverse operation of the second cylinder 29.

In the meantime, the upper mold 18 is opened, so that the tire on the paddle 49 is seated on the lower mold 7 upon lowering the paddle 49. As soon as the tire is seated, the lower limit is detected and the paddle 49 is lifted up again and chucked out to the stand-by position A by the operation of the second cylinder 29. This basic cycle of operation is repeated to process the stacked tires one after another. The movements in the respective phases of the operation are controlled by a control unit through limit switches.

The loading of the tires in the stand-by position B is performed by cooperation of the first and second cylinders 23 and 29. Namely, the loader is rotatable between M and A by the operation of the first and second cylinders 23 and 29, and the rotation between A and B is effected by the first cylinder 23 alone. In this instance, if the first cylinder 23 is actuated subsequent to actuation of the second cylinder 29, both the first and second movable arms 26 and 32 are rotated in overlapped state about the upper support structure 17 as shown particularly in FIGS. 9 and 10.

The foregoing basic operation handles the tires between M and A or between M and B, loading exclusively the unvulcanized tires which are stacked in one of the two stand-by positions prior to loading the tires in the other stand-by position.

However, it is also possible to load the tires alternately from the two stand-by positions, for example, by moving the loader in the sequence of M-A-M-B-M-A according to a program under sequence control in combination with tire stock detecting means using photoelectric tubes or the like. Namely, the present invention is applicable to the alternate loading as well as to an arbitrary loading according to a special program, in addition to the above-described exclusive loading. Further, it is to be understood that the vertical and rotary movements of each paddle are effected in relation with the condition of the tire processed on the machine, for example, the vulcanizing time and the opening and closing timing of the mold.

As clear from the foregoing description, the vulcanizing machine can be operated in an extremely efficient manner by the provision of a plural number of stack positions, affording a greater margin in the amount of stacked tires to permit a reduction of the number of persons to be stationed for the stacking job.

What is claimed is:

1. An apparatus for loading unvulcanized tires on a tire vulcanizing machine, including a vertically movable loader arm with a contractibly expansible paddle at the fore end thereof, an oscillating cylinder cooperating with a movable arm for oscillating said loader arm in a horizontal plane, and a stand-by station for temporarily holding unvulcanized tires, said loader arm being adapted to load said unvulcanized tires one after another in a mold of said machine by lifting, oscillating a paddle-expanding operations, said apparatus comprising:

a plural number of stand-by stations located on a locus of oscillatory movement of one loader arm; and a plural number of oscillating cylinders and a corresponding number of movable arms cooperative for oscillating said loader arm between the center of said mold and a selected one of said stand-by stations.

2. A method for loading an unvulcanized tire on a tire vulcanizing machine by holding said unvulcanized tire by a contractly expansible paddle, lifting and oscillating said unvulcanized tire over said machine and thereafter descending and placing said unvulcanized tire on a mold of said machine which comprises the steps of:

placing and keeping unvulcanized tires at a plural number of stand-by stations located on a locus of oscillatory movement of said unvulcanized tire, and picking up a predetermined unvulcanized tire from said stand-by stations.

* * * * *